United States Patent
Leung

(10) Patent No.: US 7,996,453 B1
(45) Date of Patent: Aug. 9, 2011

(54) METHODS AND APPARATUS FOR PROVIDING AN EFFICIENT FFT MEMORY ADDRESSING AND STORAGE SCHEME

(75) Inventor: Pak Hei Matthew Leung, Shatin (HK)

(73) Assignee: Marvell International Ltd., Hamilton (BM)

( * ) Notice: Subject to any disclaimer, the term of this patent is extended or adjusted under 35 U.S.C. 154(b) by 1015 days.

(21) Appl. No.: 11/835,214

(22) Filed: Aug. 7, 2007

Related U.S. Application Data

(60) Provisional application No. 60/822,569, filed on Aug. 16, 2006.

(51) Int. Cl.
*G06F 17/14* (2006.01)
(52) U.S. Cl. .................................................. 708/404
(58) Field of Classification Search .................. None
See application file for complete search history.

(56) References Cited

U.S. PATENT DOCUMENTS

| | | | | |
|---|---|---|---|---|
| 6,035,313 A | * | 3/2000 | Marchant | 708/404 |
| 6,081,821 A | * | 6/2000 | Hopkinson et al. | 708/406 |
| 6,629,117 B2 | * | 9/2003 | Aizenberg et al. | 708/404 |
| 6,976,047 B1 | * | 12/2005 | Rachakonda | 708/404 |
| 2005/0010628 A1 | * | 1/2005 | Vinitzky | 708/404 |
| 2005/0114421 A1 | * | 5/2005 | Gibb et al. | 708/404 |
| 2005/0177608 A1 | * | 8/2005 | Lee | 708/404 |
| 2008/0052336 A1 | * | 2/2008 | Kaufmann et al. | 708/404 |
| 2008/0208944 A1 | * | 8/2008 | Sung et al. | 708/404 |
| 2008/0288569 A1 | * | 11/2008 | Gibb et al. | 708/404 |

\* cited by examiner

*Primary Examiner* — David H Malzahn

(57) ABSTRACT

FFT butterfly data sets may be stored in memory in a predetermined order. Such an order may allow a butterfly data set to be read from a single memory address location. The memory addressed may be computed by an address rotary function depending on the butterfly and stage of the FFT. Addressing the memory in such a manner may allow each butterfly data set of a subsequent FFT stage to be stored to a single memory location. Shuffle registers may delay the writing of FFT butterfly results to the memory until most of the data corresponding to a particular butterfly operation has been computed. The shuffle registers may rearrange and combine the results of one or more butterfly operations in a different manner from which they have been computed. Combining the results in this manner may allow a subsequent FFT stage to access data by addressing a single memory location.

38 Claims, 14 Drawing Sheets

300

| number bits 240 | 3 | | | | | | | | | | | | | | | | | |
|---|---|---|---|---|---|---|---|---|---|---|---|---|---|---|---|---|---|---|
| butterfly 210 | 0<br>000 | 1<br>001 | 2<br>010 | 3<br>011 | 4<br>100 | 5<br>101 | 6<br>110 | 7<br>111 | ... | 0<br>000 | 1<br>001 | 2<br>010 | 3<br>011 | 4<br>100 | 5<br>101 | 6<br>110 | 7<br>111 | ... |
| rotate value 220 | Stage 0 => rotate value = 1 | | | | | | | | | Stage 1 => rotate value = 2 | | | | | | | | ... |
| Read address 131 | 0<br>000 | 4<br>100 | 1<br>001 | 5<br>101 | 2<br>010 | 6<br>110 | 3<br>011 | 7<br>111 | ... | 0<br>000 | 2<br>010 | 4<br>100 | 6<br>110 | 1<br>001 | 3<br>011 | 5<br>101 | 7<br>111 | ... |

FIG. 3

METHODS AND APPARATUS FOR PROVIDING AN EFFICIENT FFT MEMORY ADDRESSING AND STORAGE SCHEME

CROSS REFERENCE TO RELATED APPLICATION

This application claims the benefit of U.S. Provisional Application No. 60/822,569, filed Aug. 16, 2006 which is hereby incorporated by reference herein in its entirety.

BACKGROUND OF THE INVENTION

The present invention is directed to methods and apparatus for providing an efficient Fast Fourier Transform (FFT) memory addressing and storage scheme, and more particularly to organizing and addressing data in the memory for use in computing an FFT.

The FFT is a fast (computationally efficient) way to calculate the Discrete Fourier Transform (DFT). Functionally, the FFT decomposes the set of data to be transformed into a series of smaller data sets to be transformed. Then, the FFT decomposes those smaller sets into even smaller sets. At each stage of processing, the results of the previous stage are combined in a special way. As defined herein, butterfly operations refer to the processing and combining of the subsets of the data. The "radix" of the FFT is defined as the size of an FFT data set decomposition.

An N-point (i.e., N data points), radix-r FFT, may be processed in $\log_r(N)$ stages. At each stage of the FFT, (N/r) butterfly operations may be performed. For example, a 64-point radix-2 FFT may be processed in 6 stages where at each stage 32 butterfly operations are performed.

For each butterfly operation the number of simultaneous data points (i.e., a butterfly data set) that may be needed for processing may be equivalent to the radix of the FFT. Also, each butterfly operation may require a different butterfly data set, such that at the completion of the FFT stage, a number of combinations of butterfly data sets may be processed.

In order to provide a number of simultaneous data points for each FFT butterfly operation, the data may be arranged in several different memory data banks. In particular, each data bank may be used to store and provide one data point of the butterfly data set. For example, in a radix-4 FFT, four distinct data banks may be used, each providing one of the four data points needed for each FFT butterfly operation. This enables each data bank to receive a distinct address and provide the portion of the butterfly data set that is needed for the particular butterfly operation.

The butterfly data sets for each FFT stage may be addressed in accordance with a conventional bit reversal addressing scheme. The bit reversal addressing scheme may be used to compute the addresses for each data point in a butterfly data set at each FFT butterfly operation and stage.

Exemplary Table 1 below illustrates a conventional bit reversal addressing scheme for a 16-point, radix-2 FFT:

TABLE 1

| 1st stage | (0, 8) | (1, 9) | (2, 10) | (3, 11) | (4, 12) | (5, 13) | (6, 14) | (7, 15) |
|---|---|---|---|---|---|---|---|---|
| 2nd stage | (0, 4) | (1, 5) | (2, 6) | (3, 7) | (8, 12) | (9, 13) | (10, 14) | (11, 15) |
| 3rd stage | (0, 2) | (1, 3) | (4, 6) | (5, 7) | (8, 10) | (9, 11) | (12, 14) | (13, 15) |
| 4th stage | (0, 1) | (2, 3) | (4, 5) | (6, 7) | (8, 9) | (10, 11) | (12, 13) | (14, 15) |

Although the above FFT algorithm memory organization is useful, it lacks an efficient addressing scheme for reading butterfly data sets. In particular, for each butterfly data set, the number of different addresses that may be required to compute the butterfly operation may be equal to the radix of the FFT. For example, as illustrated in Table 1, at each FFT butterfly operation two distinct addresses may be computed. This limitation may increase cost and reduce efficiency in the FFT computation. This increases the complexity of address computation and data storage. Even if the data is arranged in a single multi-port memory module, the number of distinct addresses that may be needed for each FFT butterfly operation may increase linearly with the radix value of the FFT.

Additionally, even though address computation may seem insignificant for small radix FFT computations, the cost becomes prevalent for large data sets and high radix FFT computations. Also, such an addressing scheme requires a multi-bank or multi-port memory element which is often costly.

Accordingly, it is desirable to provide enhanced methods and apparatus for organizing, addressing and storing data in the memory for use in computing an FFT.

SUMMARY OF THE INVENTION

In accordance with the principles of the present invention, methods and apparatus are provided for providing an efficient FFT memory addressing and storage scheme.

FFT butterfly data sets may be grouped together. Each butterfly data set group may be stored in a single memory address location. Thus, only a single bank, single port memory may be required. Additionally, at each butterfly step in an FFT stage, the butterfly data set may be read by addressing a single memory address location.

An address rotary function may generate the address to the data bank. This addressing scheme may enable butterfly data sets to be written to the data bank in accordance with the access order of a subsequent FFT stage. Thus, the access order in which the butterfly data sets may be processed may depend on the butterfly data sets that may be needed in a subsequent FFT stage.

The results of each FFT butterfly operation may be processed by a set of shuffle registers. The shuffle registers may delay the writing of results to the data bank until at least one of the data sets corresponding to a particular butterfly operation is available. The shuffle registers may rearrange and combine the results of one or more butterfly operations. The results may be rearranged and combined in a manner that may allow a subsequent FFT stage to access data by addressing a single memory location.

A high radix FFT may be reduced to a low radix FFT by cascading butterfly data sets in series. Processing data in such a manner may reduce the number of shuffle registers that may be needed. This is because the amount of delay that would ordinarily be required when computing the high radix FFT may be reduced since a low radix FFT requires less data to be processed at a time.

BRIEF DESCRIPTION OF THE DRAWINGS

The above and other features of the present invention, its nature and various advantages will be more apparent upon consideration of the following detailed description, taken in conjunction with the accompanying drawings in which:

FIG. 3 is an illustrative timing diagram of the address output of an address rotary function in accordance with an embodiment of the present invention;

DETAILED DESCRIPTION

Figure 1:
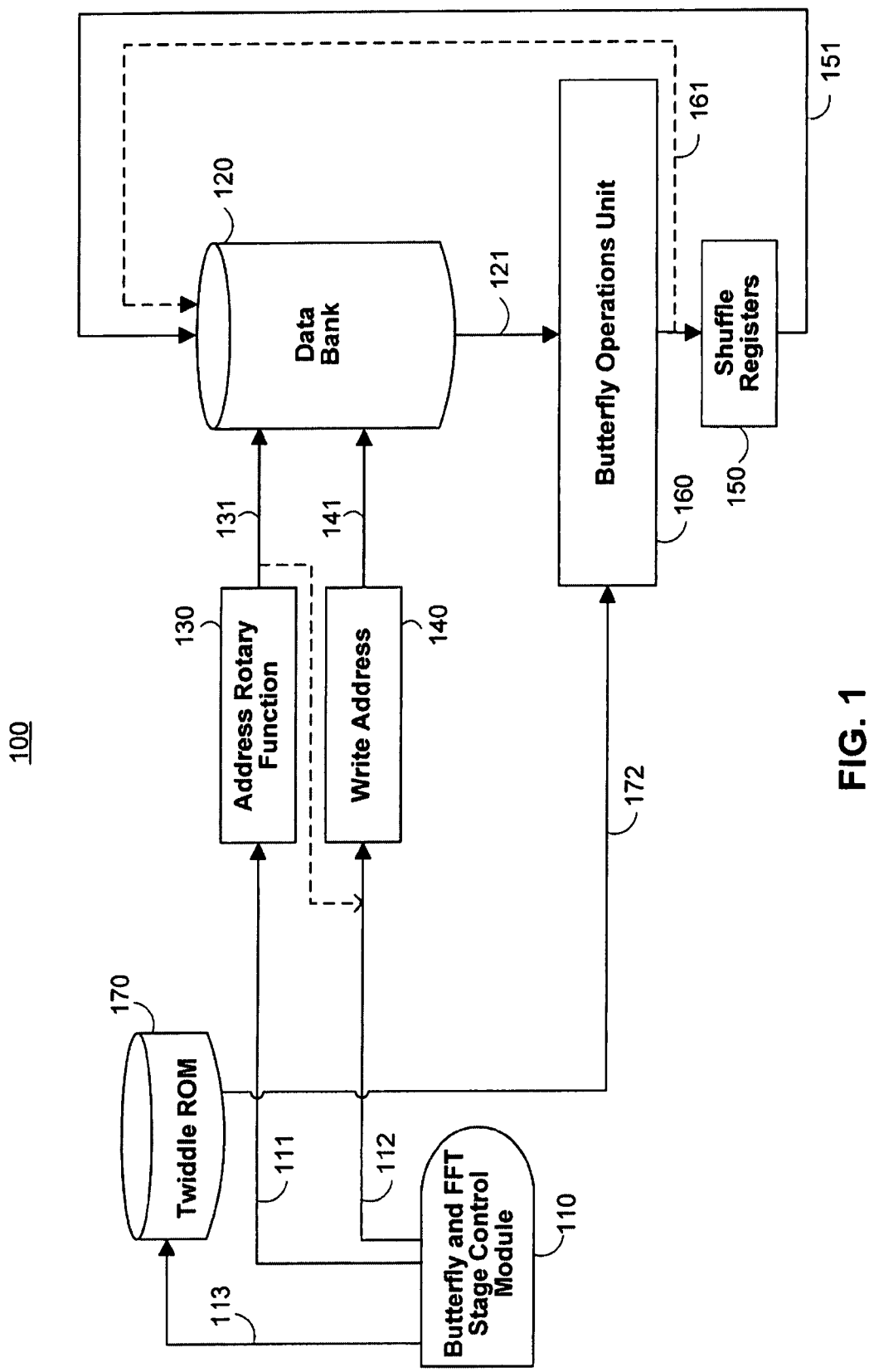
FIG. 1 is a diagram of an illustrative FFT shared-memory architecture in accordance with an embodiment of the present invention.

FIG. 1 is a diagram of an illustrative FFT shared-memory architecture 100 in accordance with principles of the present invention. FFT shared memory architecture 100 may include at least a butterfly and FFT stage control module 110, an address rotary function 130, a data bank 120, a butterfly operations unit 160, a twiddle ROM 170, and shuffle registers 150. As shown in FFT shared memory architecture 100, a single memory data bank 120 may receive a single address and provide the butterfly data sets simultaneously to butterfly operations unit 160. Accordingly, the width of data bank 120 may correspond to the radix of the FFT.

Figure 4:
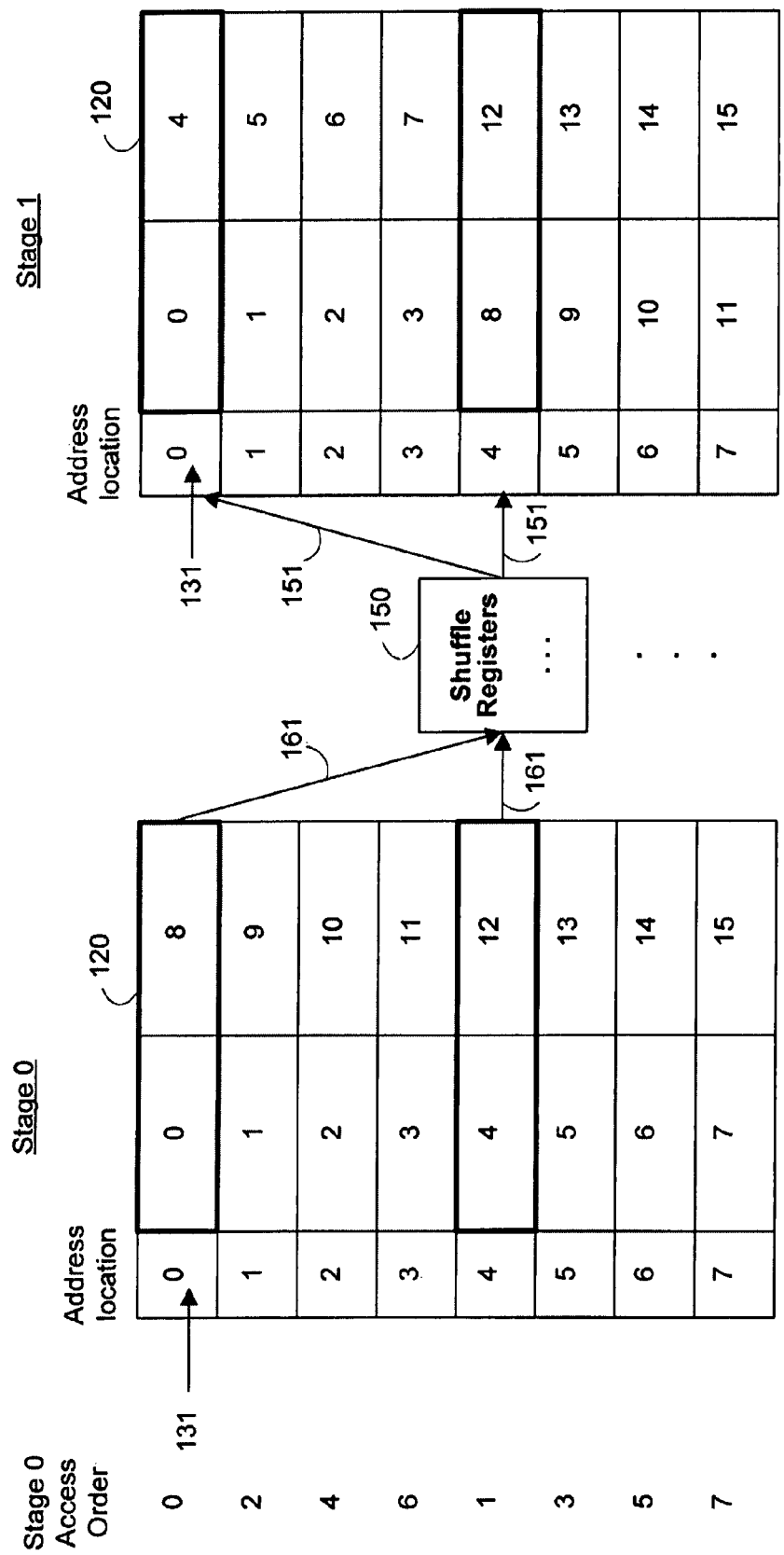
FIGS. 4a-b are diagrams of an illustrative FFT memory organization and access pattern in accordance with an embodiment of the present invention.

For example, as shown in FIGS. 4a-b, the width of data bank 120 corresponds to two data points. In particular, for a radix 2 FFT, butterfly operations unit 160 may require two data points simultaneously. Thus, in response to reading one address location from data bank 120, two data points may be provided simultaneously as the butterfly data set.

Butterfly and FFT stage control module 110 may provide a read address 113 to twiddle ROM 170 for selection of the twiddle factor that may correspond to the butterfly operation and FFT stage. Twiddle factors are understood to be complex factors of unity that may be used in the computation of an FFT.

A butterfly data set 121 may be read from data bank 120. Butterfly operations unit 160 may receive butterfly data set 121 and twiddle factors 172 from twiddle ROM 170. Butterfly operations unit 160 may perform an FFT butterfly computation and output the results 151 either directly to data bank 120 or to shuffle registers 150. A more detailed description of shuffle registers 150 will be provided in connection with FIGS. 4 and 5.

Shuffle registers 150 may delay the writing of the FFT butterfly results to data bank 120. Shuffle registers 150 may also reorder portions of the FFT butterfly results. Reordering portions of the FFT butterfly results may enable more efficient subsequent accesses to data bank 120, for example, by enabling a later FFT stage to access a butterfly data set from one memory location. Shuffle registers 150 may enable this functionality by determining the access pattern of a later FFT stage and storing the FFT butterfly results to the necessary locations.

For example, as shown in FIGS. 4a-b, shuffle registers 150 may determine which portions of the results of a butterfly operation of one stage of the FFT are needed in a second stage of the FFT. In particular as shown in FIG. 4a, the first and second butterfly sets in stage 0 of the FFT may be (0,8) and (4,12). As shown in FIG. 4b, shuffle registers 150 may determine that in a later stage (e.g., stage 1) the first and second butterfly sets may be (0,4) and (8,12). Accordingly, shuffle registers 150 may reorder the results of butterfly sets (0,8) and (4,12) and store the reordered results in the corresponding memory address locations as (0,4) and (8,12).

Referring back to FIG. 1, address rotary function 130 may generate the address of a butterfly data set stored in a single memory address location. Address rotary function 130 may determine the order in which to access the memory address locations based on the butterfly operation and stage of an FFT. Address rotary function 130 may provide the address 131 to data bank 120 for a selection of a butterfly data set. The operation of address rotary function 130 will be described in more detail in connection with FIGS. 2 and 3.

Butterfly and FFT stage control module 110 may provide the butterfly and FFT stage information 111/112 to address rotary function 130 and write address 140. Address rotary function 130 may use information 111 to generate the appropriate memory address location. Similarly, write address 140 may use information 112 to generate a write address 141 to cause data to be written to an appropriate memory address location in data bank 120. It should be understood that although butterfly and FFT stage information 111/112 are drawn as single lines, each line may represent any number of different addresses, bit values, or information that may be provided to address rotary function 130 or write address 140.

Butterfly and FFT stage control module 110 may generate butterfly and FFT stage information 111/112 by maintaining a set of counters. For example, butterfly and FFT stage control module 110 may be configured to operate a 16-point, radix-2 FFT. Consequently, butterfly and FFT stage control module 110 may determine that eight butterfly operations are required for each stage. Additionally, butterfly and FFT stage control module 110 may determine that there are four stages to the FFT. Accordingly, two sets of counters (e.g., one counting to eight and another to four) may be used to keep track of and generate information that may correspond to the butterfly and FFT stage information.

Information 111/112 may also include various control signals. Such signals may cause the FFT computations or data in data bank 120 or shuffle registers 150 to reset, start, stop, pause, clear, or any other desired functionality. For example, a clear signal may cause data bank 120 to clear, address rotary function 130 to reset its operations or shuffle registers 150 to clear any data that is registered. Similarly, a start signal may indicate to address rotary function 130 or butterfly operations unit 160 to begin processing data.

Write address 140 may receive the address generated by address rotary function 130 or may generate an address using information 111/112 received from butterfly and FFT stage control module 110. Memory write address 141, provided by write address 140, may correspond to one or more addresses of previously processed butterfly data sets. This may allow data from shuffle registers 150 to be stored to the appropriate locations in data bank 120. In particular, write address 140 may cause butterfly results to be written to data bank 120 in the order in which they may be processed and needed in subsequent FFT stages. Consequently, write address 140 may delay writing shuffled results to data bank 120 until all of the data needed in a subsequent FFT stage has been processed. Thus, for a radix-r FFT, write address 140 may delay writing shuffled results by (r−1) butterfly operations.

For example, as shown in FIG. 4a, at FFT stage 0 the butterfly data set stored in memory address location '0' may be processed before the butterfly data set stored in memory address location '4'. Write address 140 may cause the shuffled butterfly operation results 151 from shuffle registers 150 to be stored in the same order as they were processed (e.g., storing the first shuffled results to location '0' and the second shuffled results to location '4'). Similarly, for higher radix FFT applications (e.g., radix-4), four results may be stored in the same manner as that which the four butterfly data sets have been processed. However, for a radix-4 FFT write address may delay writing the shuffled results until the completion of at least three butterfly operations.

It should be understood that the functionality contained in butterfly and FFT stage control module 110 may be included in address rotary function 130 and write address 140. Similarly, address rotary function 130 and write address 140 may be integrated with butterfly and FFT stage control module 110. However, for illustrative purposes these modules are drawn and described separately.

Figure 2:
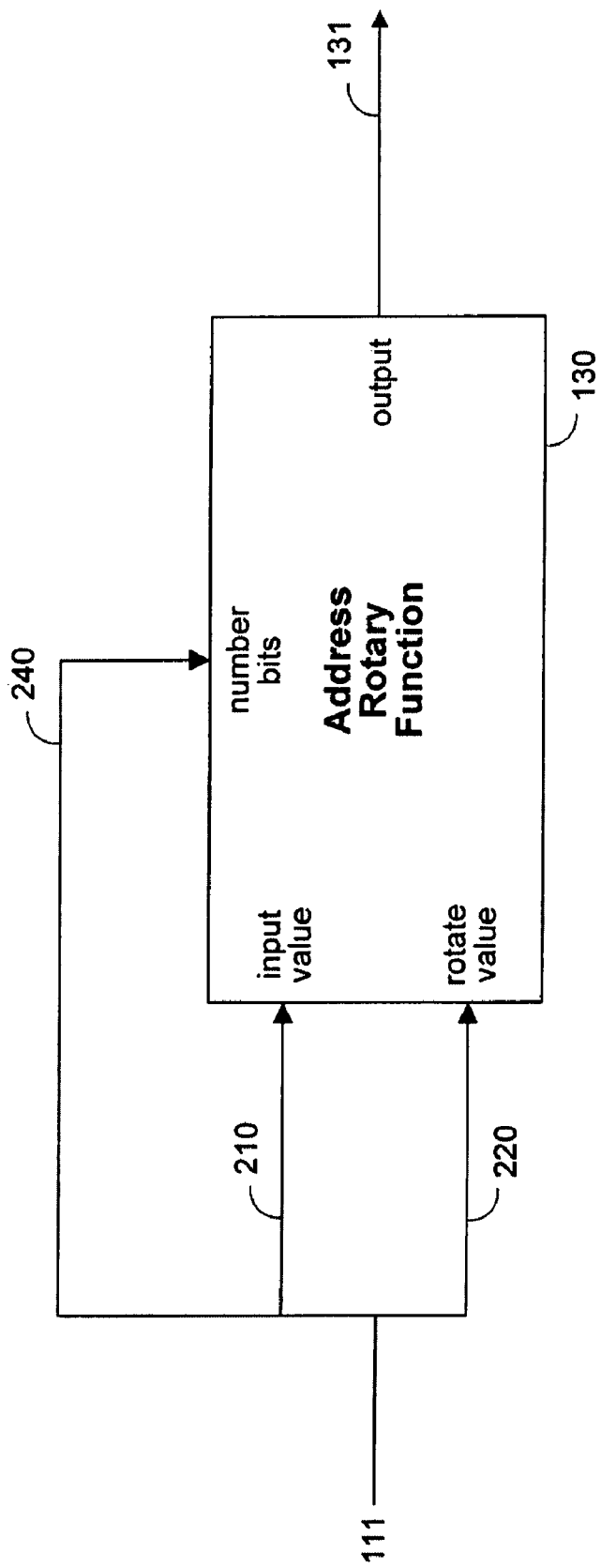
FIG. 2 is a detailed illustration of an address rotary function in accordance with an embodiment of the present invention.

FIG. 2 illustrates address rotary function 130 in more detail. As discussed above, address rotary function 130 may receive information 111/112 from butterfly and FFT stage control module 110. Address rotary function 130 may use information 111/112 to perform a rotate algorithm for generating a read address 131. Read address 131 may be used to access one or more butterfly data sets in data bank 120.

Address rotary function 130 may determine which butterfly data sets are needed in a subsequent FFT stage. Based on this determination address rotary function 130 may access data bank 120 in a way that allows each processed butterfly data set, which may be needed in a subsequent FFT stage, to be stored in a single memory address location.

For example, as shown in FIG. 4a, the data may be arranged in data bank 120 in a way that allows each butterfly data set of stage 0 to be accessed from a single memory address location. In particular, as shown in Table 1, for a 16-point, radix-2 FFT the butterfly data sets for stage 0 of the FFT may be (0,8), (1,9), . . . , and (7,15). Thus, initially the data may be stored in data bank 120 in that order from the first memory address location to the last. As shown in Table 1, for stage 1 of the FFT the butterfly data sets may be (0,4), (1,5), . . . , and (11,15). Therefore, in order to allow each butterfly data set to be stored in a single memory address location (in order to avoid reading multiple memory address locations), address rotary function 130 may determine the butterfly data sets that are needed in the subsequent stages of the FFT and access those data sets in a particular order.

For example, address rotary function 130 may cause butterfly data set (0,8) in stage 0 of the FFT to be accessed first. Address rotary function 130 may determine that in a subsequent FFT stage (e.g., stage 1), the data point '8' is in a butterfly data set with data point '12'. Thus, address rotary function 130 may determine the memory address location of data point '12' in stage 0 in order to access and process the butterfly data set of data point '12' next (e.g., butterfly data set (4,12)). This way processed data point '12' may be available for concurrent storage with data point '8'. This may enable the next FFT stage to access data set (8,12) from one location.

Similarly, address rotary function 130 may determine that data point '0' is in a butterfly data set with data point '4' in the next stage (e.g., stage 1). Accordingly, address rotary function 130 may access the butterfly data set (4,12) that may contain data point '4' instead. This may cause the butterfly result of data point '4' to be available for concurrent storage with the result of data point '0'.

As described above, address rotary function 130 performs an algorithm based on the butterfly and FFT stage. This algorithm may generate addresses that may access butterfly data sets in data bank 120 in a manner that may enable the butterfly data sets of a subsequent FFT stage to be available for storage to single memory address locations.

Address rotary function 130 may generate the address for each memory address location in accordance with the following equation:

$$\text{Address}=\text{ROTATE}_N(x,y) \quad \text{EQ1}$$

where the ROTATE function circularly shifts a number 'x' by 'y' bits to the right around 'N' bits. Address rotary function 130 may receive the butterfly operation count as the 'x' value, the (stage count+1)*(number of bits per radix (i.e., z)) as the 'y' value, and the number of bits in the total number of butterfly operations per stage (i.e., k) as the N value.

The number of bits in the total number of butterfly operations per stage (i.e., 'k') may be computed in accordance with the following equation:

$$k=\log_2(M/r) \quad \text{EQ2}$$

where M is the number of points of a radix-r FFT.

The number of bits per radix of the FFT (i.e., 'z') may be computed in accordance with the following equation:

$$z=\log_2(r) \quad \text{EQ3}$$

where r is the radix value of the FFT.

For example, for a 16-point, radix-2 FFT the value for 'N' may be 3 bits (e.g., $\log_2(16/2)$). The value for 'x' may include the range of numbers from 0 to 8, and the value for 'y' may include the range of numbers from 1 to 4. In particular, for the fourth butterfly operation of the second FFT stage, the address may be computed as $\text{ROTATE}_3$("0011", ("0001")+1) *1). To produce the address, the butterfly operation count should be circularly shifted 2 times to the right around 3 bits. Accordingly, the memory address location that may be produced may be "0110" (e.g., '6').

Address rotary function 130 may receive as its inputs the values of the butterfly counter 210, stage counter 220, and the number of bits in the total number of butterfly operations per stage 240 from butterfly and FFT stage control module 110. These values may be derived from information 111/112.

Address rotary function 130 may compute the value for the 'y' input of the algorithm (e.g., (stage counter value+1)* (number of bits per radix)). Alternatively, butterfly and FFT stage control module 110 may pre-compute that value and provide it as stage counter value 220.

FIG. 3 is an illustrative timing diagram 300 of read address 131 of address rotary function 130. Exemplary read address 131 shown in FIG. 3 corresponds to a 16-point, radix-2 FFT. It should be understood that FIG. 3 illustrates an exemplary output and its principles may be applied to any N-point, radix-r FFT.

In order to reduce the complexity of performing the ROTATE function, the addresses may be precomputed and stored in a look-up table. For example, instead of computing the address output for the second butterfly operation of the third stage of an FFT using the ROTATE function, the value may be stored in a table in address rotary function 130. Thus, when address rotary function 130 receives the values for a particular butterfly operation and FFT stage, it may perform a look-up in the table for these values and output the correct address. This, is simple to implement because the values for the addresses may all be pre-determined and have no dependent variables. However, this type of configuration may be undesirable for large radix FFT computations with a large number of points.

As discussed above, FIGS. 4*a-b* are diagrams of an illustrative FFT memory organization and access pattern. As shown in FIG. 4*a*, address rotary function 130 may access memory address location '0' first for the first butterfly operation of the first FFT stage. The results of the FFT butterfly operation 161 may be stored in shuffle registers 150. Address rotary function 130 may then access memory address location '4'. Memory address location '4' may be accessed next because a portion of its butterfly data set may need to be paired up with the previously accessed butterfly data set (e.g., (0,8)) in a subsequent FFT stage. As defined herein, a paired up butterfly data set refers to two or more points that may be accessed from a single memory address location. In particular, data point '8' in the butterfly data set (0,8) of the first FFT stage may need to be paired up with data point '12' in the second FFT stage. Because data point '12' is found at address location '4', the butterfly data set (4,12) may be accessed to allow data point '8' to be stored concurrently with data point '12'.

Shuffle registers 150 may delay the writing of results 161 until all values of a butterfly operation are available. In particular, after butterfly data set (0,8) has completed being processed by butterfly operations unit 160, it may be delayed until butterfly data set (4,12) has completed being processed. That is, because data point '8' should be stored with data point '12' for use in a subsequent stage, delaying the writing of data point '8' until data point '12' has been processed allows the results of data points '8' and '12' to be combined and written to the same memory address location (e.g., address location '4').

The number of shuffle registers that may be needed to delay the writing of results 161 may equal to the number of data points in a radix-r FFT (e.g., r number of data points) multiplied by (r−1). For example, for a radix-8 FFT, eight data points may be needed at each FFT butterfly operation. Thus the number of shuffle registers that may be needed may be 56. This may allow eight butterfly data sets to be delayed seven times. Thus, all of the data points may be available for shuffling and writing to the appropriate locations for access in a subsequent FFT stage.

In another embodiment, it may be desirable to reduce the number of shuffle registers that may be needed when computing a high radix FFT. This may be performed by computing a number of smaller radix FFT butterfly operations. For example, a radix-8 FFT may be computed by performing three radix-2 FFT butterfly operations. Thus, instead of using 56 shuffle registers to compute a radix-8 FFT, 6 shuffle registers may be used. In order to perform a smaller number of FFT butterfly operations to compute a high radix FFT, each of the smaller butterfly operations may be cascaded in series. Thus, each butterfly data set may be read in series and computed by the butterfly operations unit.

Shuffle registers 150 may also perform the function of reorganizing (e.g., shuffling) the processed data points. This may be necessary because the butterfly data sets may change from one stage to the next. For example, at stage 0 data point '8' may be paired up with data point '0', whereas in stage 1 data point '8' may be paired up with data point '12'. After shuffle registers 150 delay butterfly results 161, shuffle registers 150 may determine how the data points should be paired up. This functionality may allow the butterfly data sets to be stored in data bank 120 in accordance with their access order of the FFT stage. Thus, at each stage of the FFT, the results of the shuffling may produce data points in data bank 120 that may be paired up in accordance with the stage 0 to stage 1 pairings illustrated in FIGS. 4*a-b* or any of the pairings shown in Table 1 (described above).

It should be understood that the functionality of shuffling or rearranging the data points may alternatively be included in data bank 120 to reduce the complexity of shuffle registers 150. Additionally, it should also be understood that shuffle registers 150 may be included in data bank 120 and are drawn separately for illustration purposes.

Figure 5:
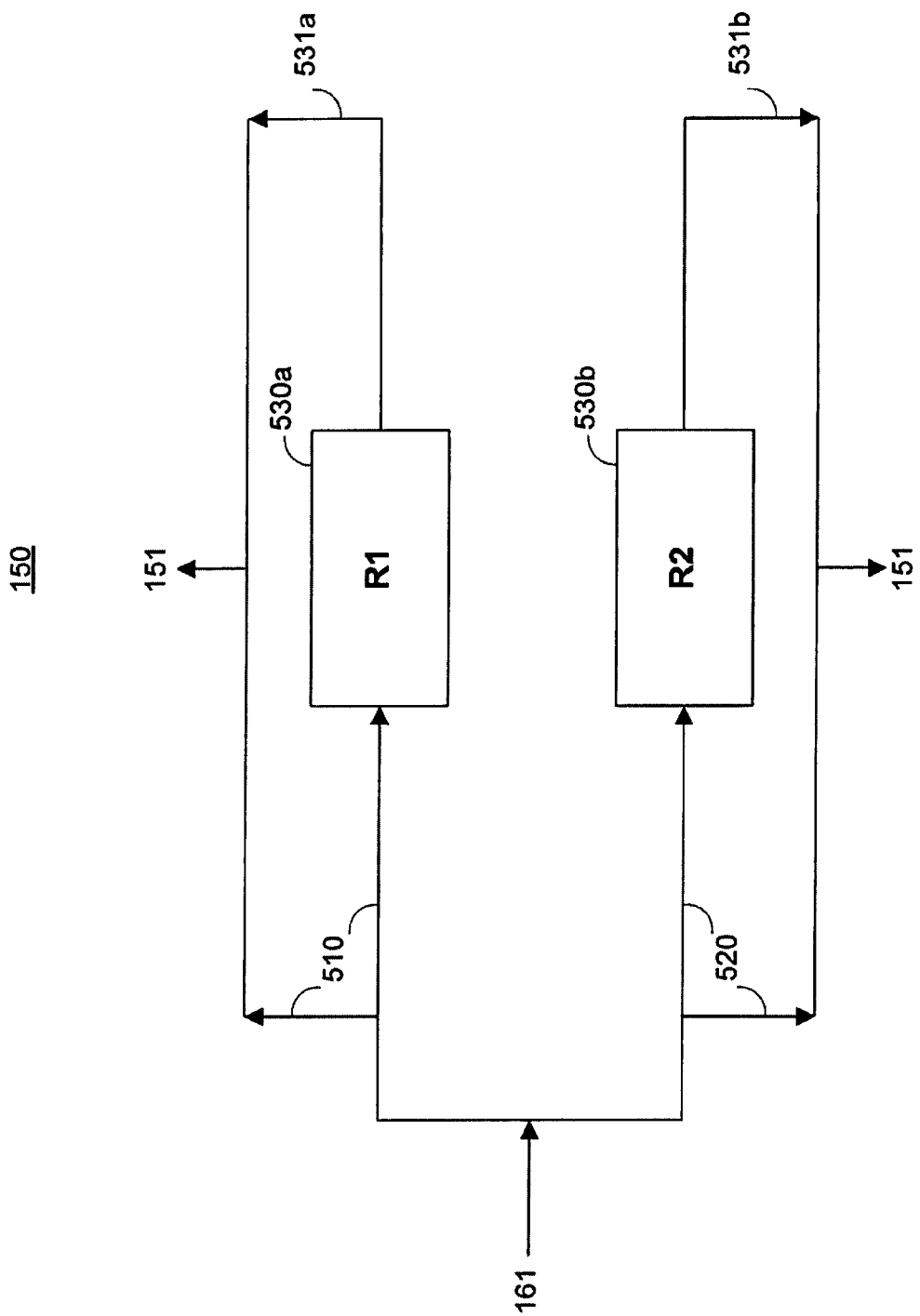
FIG. 5 is a detailed block diagram of shuffle registers in accordance with an embodiment of the present invention.

FIG. 5 is a detailed block diagram of shuffle registers 150 that may be used for a radix-2 FFT. Shuffle registers 150 may include at least two registers 530*a-b* for storing the high order data point result 510 and the low order data point result 520. In particular, the FFT butterfly operation may be performed on a butterfly data set that may be derived from a pair of data points (stored as a single word in data bank 120). For example, in a radix-2 FFT, the high order bits of the data word may correspond to the first data point of the butterfly data set and may produce high order result 510. Similarly, the low order bits may correspond to the second data point of the butterfly data set and may produce low order data point result 520.

As FFT butterfly results 161 are received at shuffle registers 150, high order data point result 510 and low order data point result 520 may be delayed individually by two registers 530*a* and 530*b*. It should be understood that high and low order results 510 and 520 may be alternatively delayed together using a single register (not shown). However, for purposes of illustration the delay of high and low order results 510 and 520 are drawn separately.

Registers 530*a* and 530*b* may delay results 161 by a first amount (e.g., one FFT butterfly cycle). Register 530*a* may produce a high order delayed result 531*a*. Similarly, register 530*b* may produce a low order delayed result 531*b*. It should be understood that one FFT butterfly cycle may be equivalent to more than one clock cycle. Accordingly, for an FFT butterfly cycle that is equivalent to, for example, four clock cycles, the first delay amount may also be four clock cycles.

As the next set of FFT butterfly results 161 are received at shuffle registers 150, high and low order results 510 and 520 may be shuffled with high and low order delayed results 531*a* and 531*b*. This shuffling step may provide the output 151 of shuffle registers 150 for storage to data bank 120. The shuffling may be performed such that high order result 510 may be combined with high order delayed result 531*a*. Similarly, low order result 520 may be combined with low order delayed result 531*b*. Accordingly, each of the shuffled results may be stored to a single address location, in data bank 120.

For example, as shown in FIG. 4*a*, pair of data points (0,8) (i.e., the butterfly data set) may include high order data point '0' and low order data point '8'. The FFT butterfly operation may produce a respective high order result 510 corresponding to data point '0'. Similarly, a respective low order result 520 corresponding to data point '8' may be produced. Shuffle registers 150 may delay these results by a first amount.

A next pair of data points (4,12) may include high order data point '4' and low order data point '12'. The high and low order data point results produced by the FFT butterfly operation may be shuffled with the delayed results corresponding to '0' and '8'. The shuffling may be performed such that high order data point delayed result '0' may be combined with the data point result corresponding to high order data point '4'.

Similarly, low order data point delayed result '8' may be combined with the data point result corresponding to low order data point '12'.

Thus, as shown in FIG. 4b, the pair of data points may be shuffled in a way that may be consistent with their access order shown in Table 1 (described above) for the second FFT stage. In particular, as shown in FIG. 4b, the butterfly data set at the first address location in data bank 120 may be (0,4) and the butterfly data set at another address location (e.g., the fifth address location) may be (8,12). Consequently, the butterfly data sets may be read from a single memory location during the computation of the second FFT stage.

It should be understood that although FIG. 5 illustrates a 2 register 530 implementation of shuffle registers 150 for a radix-2 FFT, any number of registers 530 may be provided. In particular, as described above, a radix-4 FFT may require 12 registers 530 to delay butterfly results 161 by the appropriate amount.

Figure 6:
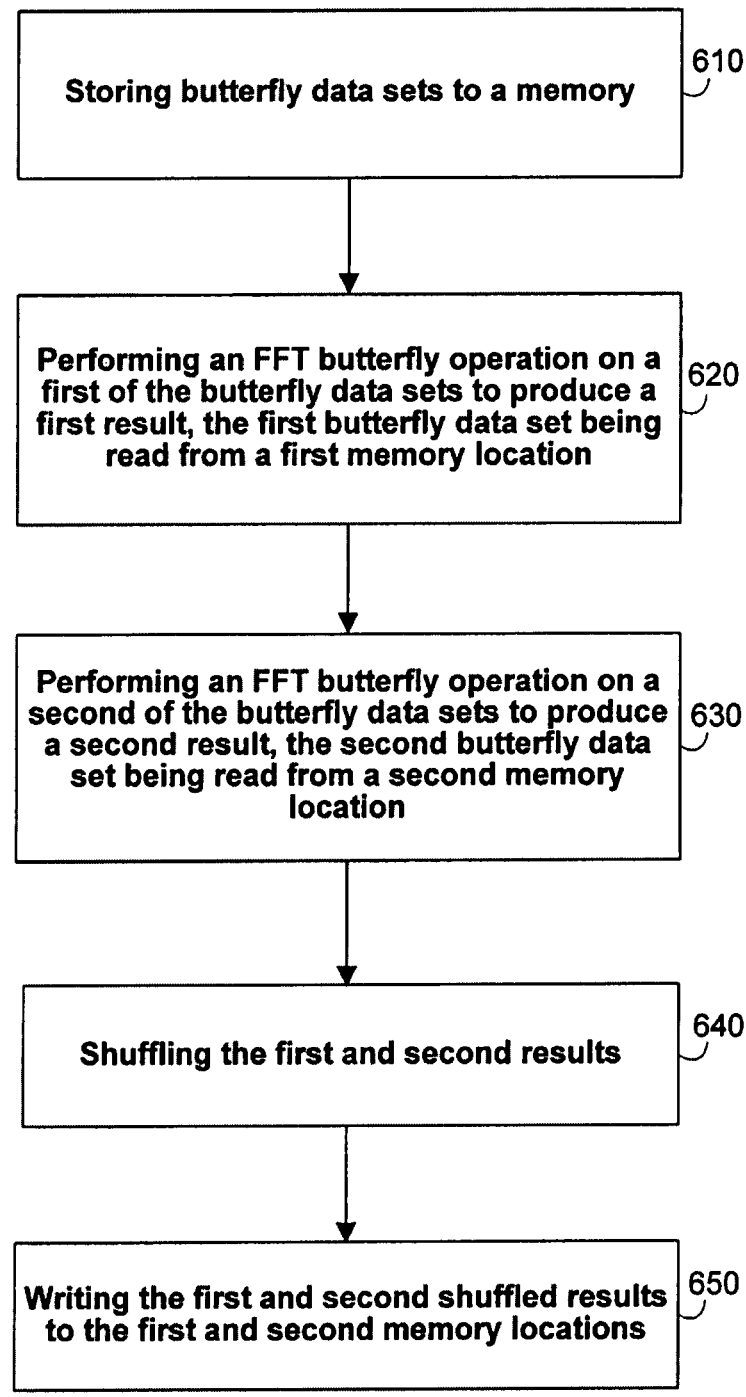
FIG. 6 illustrates a method of organizing and processing data in a shared-memory FFT architecture in accordance with an embodiment of the present invention.

FIG. 6 illustrates a method 600 of organizing and processing data in a shared-memory FFT architecture. At step 610, a plurality of butterfly data sets may be stored to a memory. For example, as shown in FIG. 4a the butterfly data sets may be stored to data bank 120 in a predetermined order. The predetermined order may enable each butterfly data set to be read from a single memory address location. The butterfly data sets for a 64-point, radix-2 FFT may correspond to the butterfly data sets listed in the first stage of Table 1 (described above).

At step 620, an FFT butterfly operation may be performed on a first butterfly data set to produce a first result. The first butterfly data set may be read from a first memory location. For example, as shown in FIG. 4a butterfly data set (0,8) may be read from the first memory location of data bank 120. The address for the first memory location may be computed in accordance with the rotary function described in connection with FIGS. 1-3.

At step 630, an FFT butterfly operation may be performed on a second butterfly data set to produce a second result. The second butterfly data set may be read from a second memory location. For example, as shown in FIG. 4a butterfly data set (4,12) may be read from the second memory location of data bank 120. The address for the second memory location may be computed in accordance with the rotary function described in connection with FIGS. 1-3.

At step 640, the first and second results of the FFT butterfly operations may be shuffled to produce a first and a second shuffled result. For example, as shown in FIGS. 4a-b, the results of the FFT butterfly operations performed on butterfly data sets (0,8) and (4,12) may be shuffled using shuffle registers 150. The shuffling may cause the high order results corresponding to high order data points '0' and '4' to be combined. Similarly, the low order results corresponding to low order data points '8' and '12' may also be combined.

At step 650, the first and second shuffled results may be written to the first and second memory locations. For example, as shown in FIG. 4b the shuffled results (0,4) and (8,12) may be written to the first and second memory locations. The first and second memory locations where the data may be written may be provided by write address 140 (FIG. 1).

Figure 7:
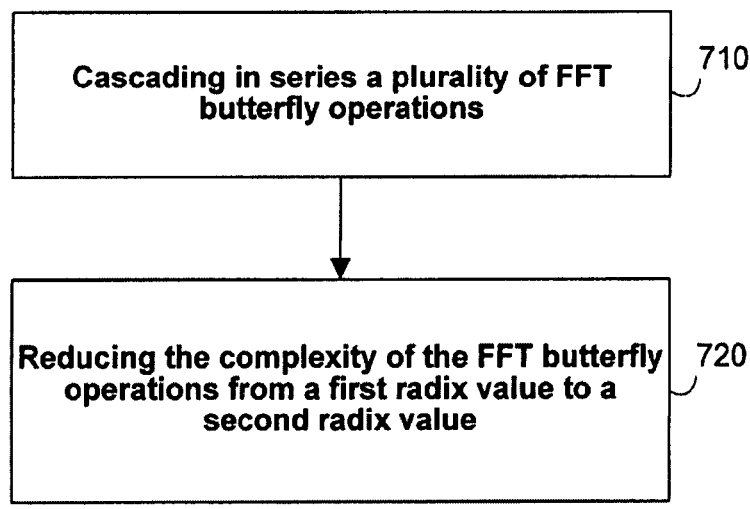
FIG. 7 illustrates a method of reducing the complexity of high radix FFT computations in accordance with an embodiment of the present invention.

FIG. 7 illustrates a method 700 of reducing the complexity of high radix FFT computations. At step 710, multiple FFT butterfly operations may be cascaded in series. For example, to compute a high radix FFT, a portion of the butterfly operations may be computed in series. This may reduce the total number of butterfly operations that may be needed. This may also reduce the number of shuffle registers that may be needed to store intermediate results.

At step 720, the complexity of the FFT butterfly operations may be reduced from a first radix value to a second radix value. For example, a radix-8 FFT may be computed by performing three radix-2 FFT operations. This may also reduce the number of shuffle registers that may be needed.

Referring now to FIGS. 8A-8G, various exemplary implementations of the present invention are shown.

Figure 8A:
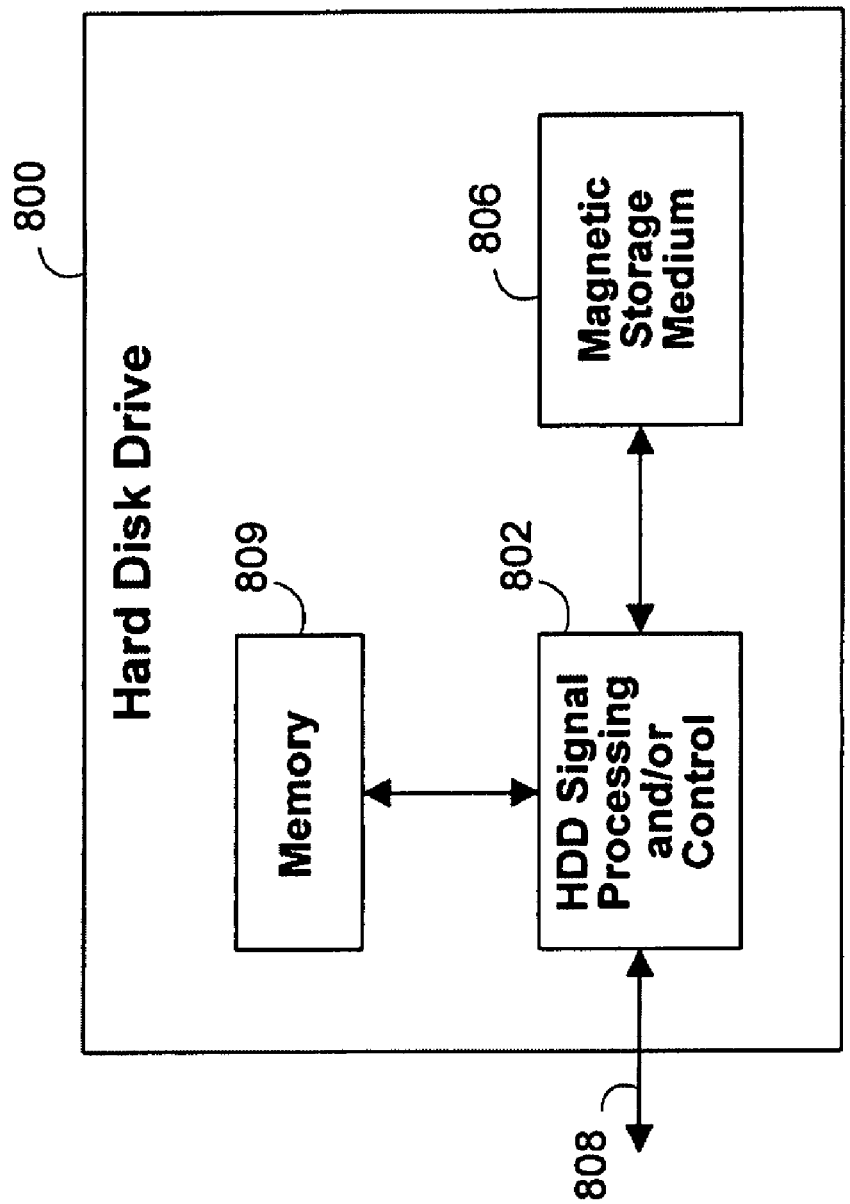
FIG. 8A is a block diagram of an exemplary hard disk drive that can employ the disclosed technology.

Referring now to FIG. 8A, the present invention can be implemented in a hard disk drive 800. The embodiment of the present invention may implement either or both signal processing and/or control circuits, which are generally identified in FIG. 8A at 802. In some implementations, the signal processing and/or control circuit 802 and/or other circuits (not shown) in the HDD 800 may process data, perform coding and/or encryption, perform butterfly and FFT stage control, and/or address rotary function, and/or butterfly operations, and/or shuffle registers, and/or perform calculations, and/or format data that is output to and/or received from a magnetic storage medium 806.

The HDD 800 may communicate with a host device (not shown) such as a computer, mobile computing devices such as personal digital assistants, cellular phones, media or MP3 players and the like, and/or other devices via one or more wired or wireless communication links 808. The HDD 800 may be connected to memory 809 such as random access memory (RAM), nonvolatile memory such as flash memory, read only memory (ROM) and/or other suitable electronic data storage. Memory 809 may be used to implement either or both data bank 120, and/or twiddle ROM 170, and/or address rotary function 130.

Figure 8B:
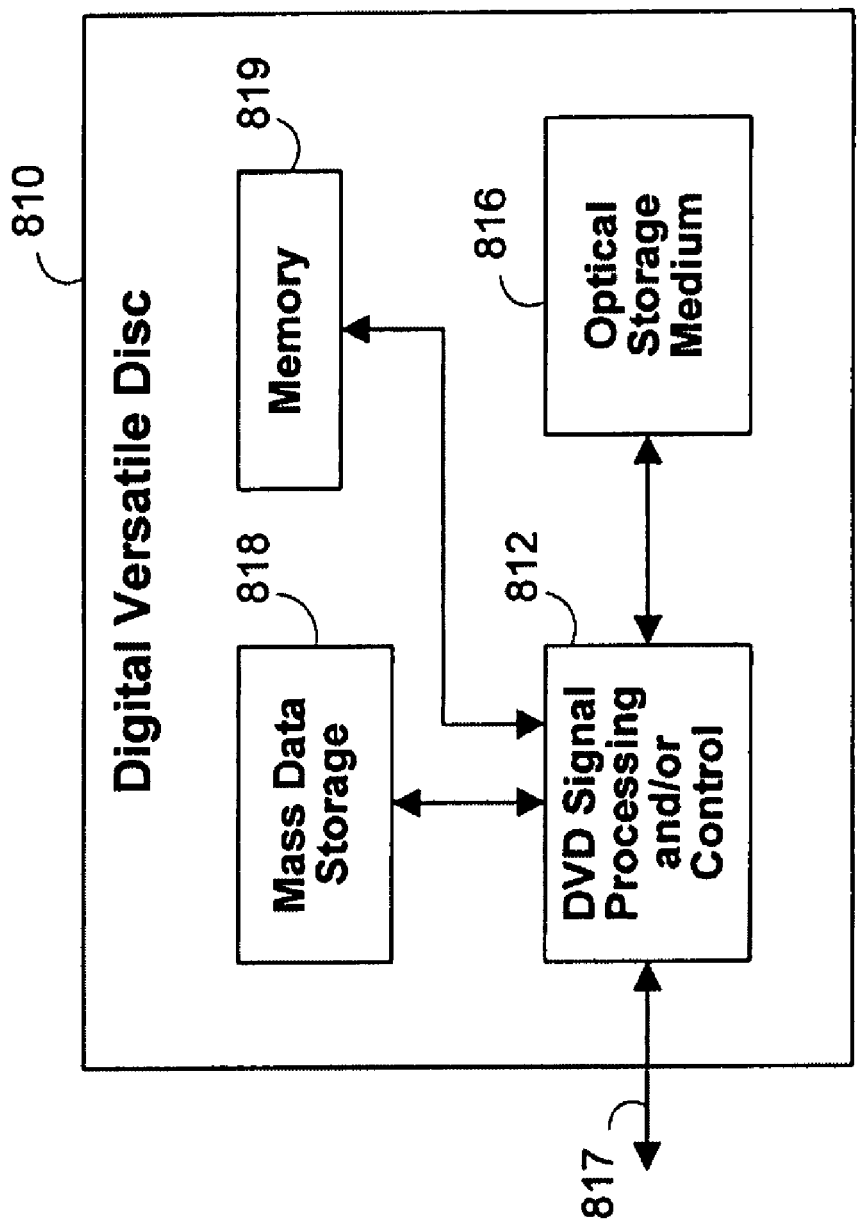
FIG. 8B is a block diagram of an exemplary digital versatile disc that can employ the disclosed technology.

Referring now to FIG. 8B, the present invention can be implemented in a digital versatile disc (DVD) drive 810. The embodiment of the present invention may implement either or both signal processing and/or control circuits, which are generally identified in FIG. 8B at 812, and/or mass data storage 818 of the DVD drive 810. The signal processing and/or control circuit 812 and/or other circuits (not shown) in the DVD 810 may process data, perform coding and/or encryption, perform calculations, and/or format data that is read from and/or data written to an optical storage medium 816. In some implementations, the signal processing and/or control circuit 812 and/or other circuits (not shown) in the DVD 810 can also perform other functions such as encoding and/or decoding, and/or perform butterfly and FFT stage control, and/or address rotary function, and/or butterfly operations, and/or shuffle registers and/or any other signal processing functions associated with a DVD drive.

The DVD drive 810 may communicate with an output device (not shown) such as a computer, television or other device via one or more wired or wireless communication links 817. The DVD 810 may communicate with mass data storage 818 that stores data in a nonvolatile manner. The mass data storage 818 may include a hard disk drive (HDD). The HDD may have the configuration shown in FIG. 8A. The HDD may be a mini HDD that includes one or more platters having a diameter that is smaller than approximately 1.8". The DVD 810 may be connected to memory 819 such as RAM, ROM, nonvolatile memory such as flash memory and/or other suitable electronic data storage. Memory 819 and/or mass data storage 818 may be used to implement either or both data bank 120, and/or twiddle ROM 170, and/or address rotary function 130.

Figure 8C:
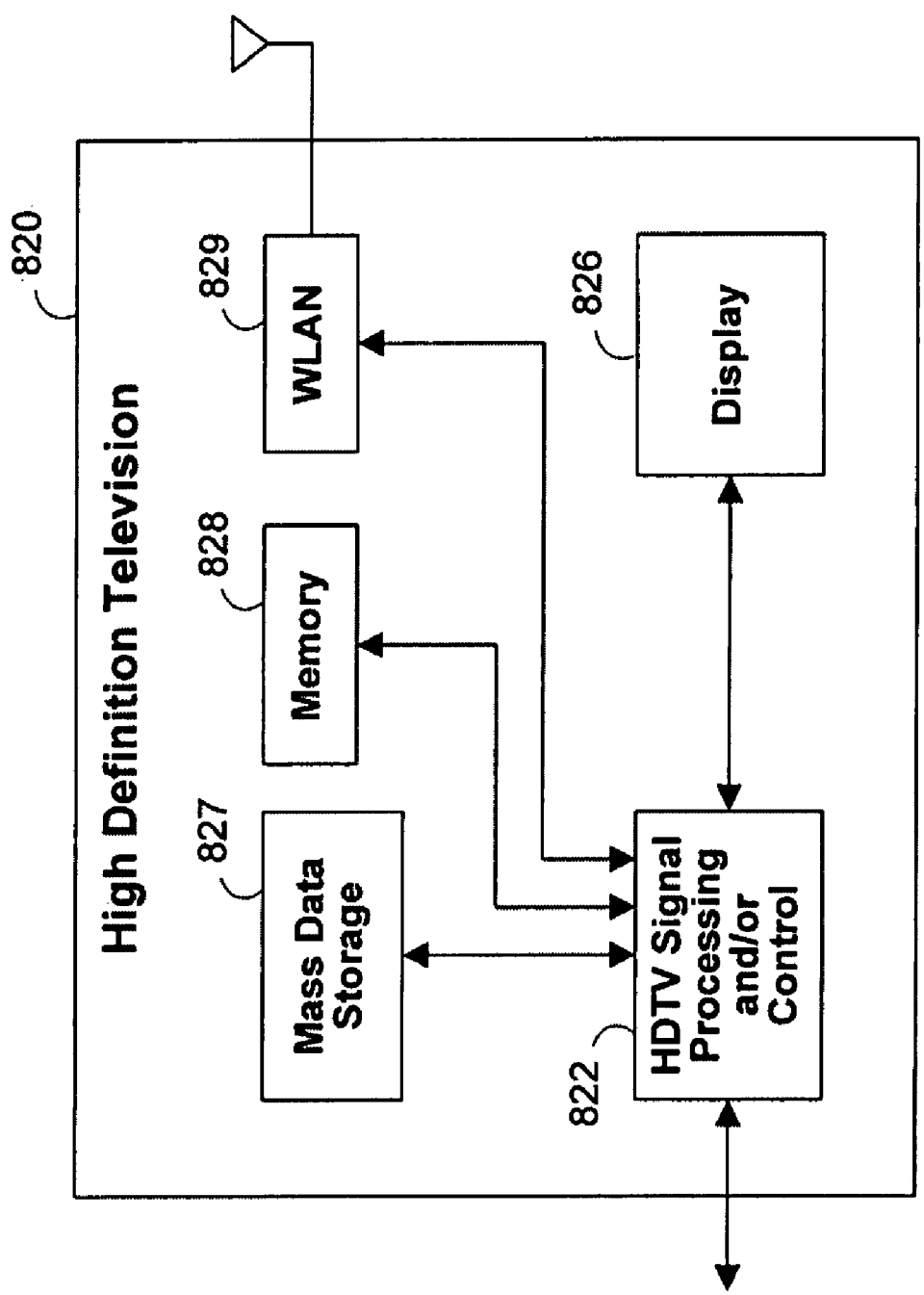
FIG. 8C is a block diagram of an exemplary high definition television that can employ the disclosed technology.

Referring now to FIG. 8C, the present invention can be implemented in a high definition television (HDTV) 820. The embodiment of the present invention may implement either or both signal processing and/or control circuits, which are generally identified in FIG. 8C at 822, a WLAN network interface 829 and/or mass data storage 827 of the HDTV 820. The HDTV 820 receives HDTV input signals in either a wired or wireless format and generates HDTV output signals for a display 826. In some implementations, signal processing circuit and/or control circuit 822 and/or other circuits (not shown) of the HDTV 820 may process data, perform coding and/or encryption, and/or perform butterfly and FFT stage control, and/or address rotary function, and/or butterfly operations, and/or shuffle registers, and/or perform calculations, format data and/or perform any other type of HDTV processing that may be required.

The HDTV 820 may communicate with mass data storage 827 that stores data in a nonvolatile manner such as optical and/or magnetic storage devices. At least one HDD may have the configuration shown in FIG. 8A and/or at least one DVD may have the configuration shown in FIG. 8B. The HDD may be a mini HDD that includes one or more platters having a diameter that is smaller than approximately 1.8". The HDTV 820 may be connected to memory 828 such as RAM, ROM, nonvolatile memory such as flash memory and/or other suitable electronic data storage. The HDTV 820 also may support connections with a WLAN via a WLAN network interface 829. Memory 828 and/or mass data storage 827 may be used to implement either or both data bank 120, and/or twiddle ROM 170, and/or address rotary function 130.

Figure 8D:
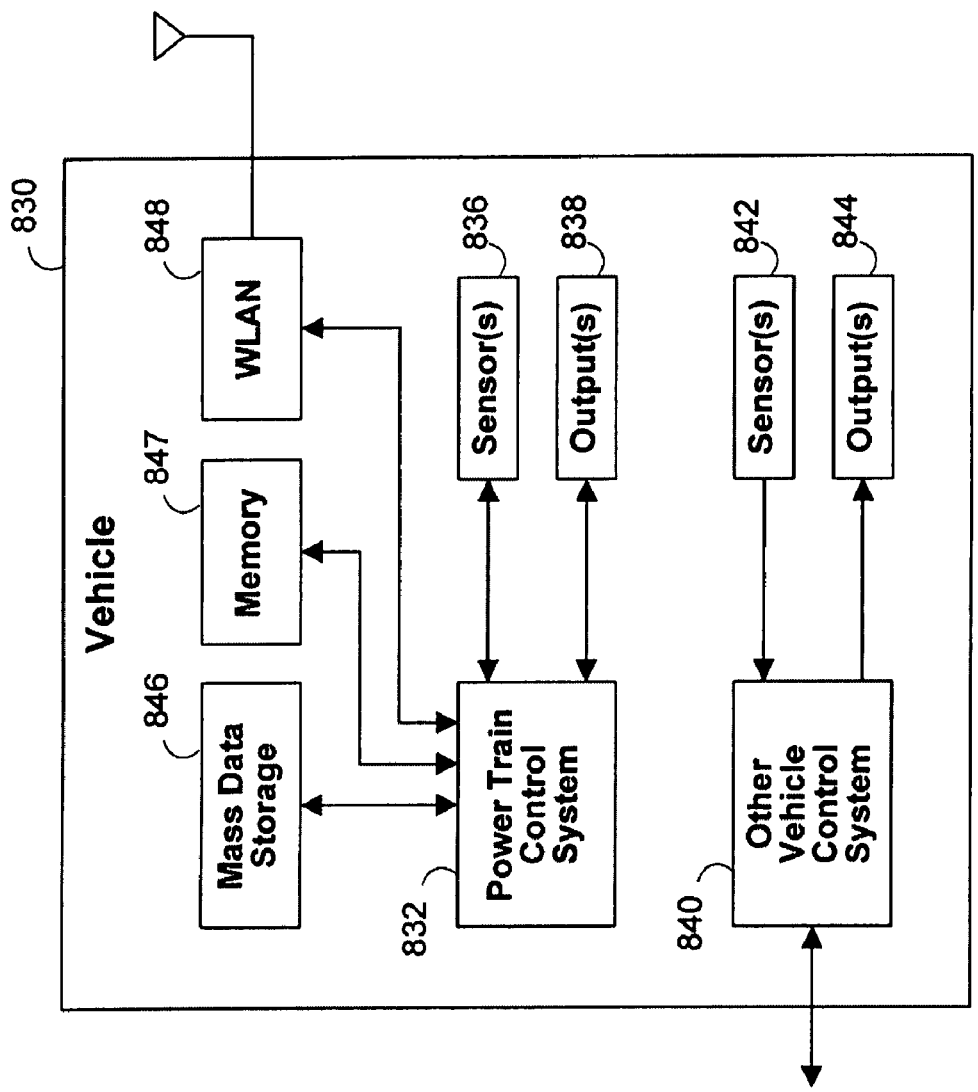
FIG. 8D is a block diagram of an exemplary vehicle that can employ the disclosed technology.

Referring now to FIG. 8D, the present invention implements a control system of a vehicle 830, a WLAN interface 848 and/or mass data storage 846 of the vehicle control system. In some implementations, the embodiment of the present invention may implement a powertrain control system 832 that receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals.

The present invention may also be implemented in other control systems 840 of the vehicle 830. The control system 840 may likewise receive signals from input sensors 842 and/or output control signals to one or more output devices 844. In some implementations, the control system 840 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

The powertrain control system 832 may communicate with mass data storage 846 that stores data in a nonvolatile manner. The mass data storage 846 may include optical and/or magnetic storage devices for example hard disk drives HDD and/or DVDs. At least one HDD may have the configuration shown in FIG. 8A and/or at least one DVD may have the configuration shown in FIG. 8B. The HDD may be a mini HDD that includes one or more platters having a diameter that is smaller than approximately 1.8". The powertrain control system 832 may be connected to memory 847 such as RAM, ROM, nonvolatile memory such as flash memory and/or other suitable electronic data storage. The powertrain control system 832 also may support connections with a WLAN via a WLAN network interface 848. The control system 840 may also include mass data storage, memory and/or a WLAN interface (all not shown). Memory 847 and/or mass data storage 846 may be used to implement either or both data bank 120, and/or twiddle ROM 170, and/or address rotary function 130.

Figure 8E:
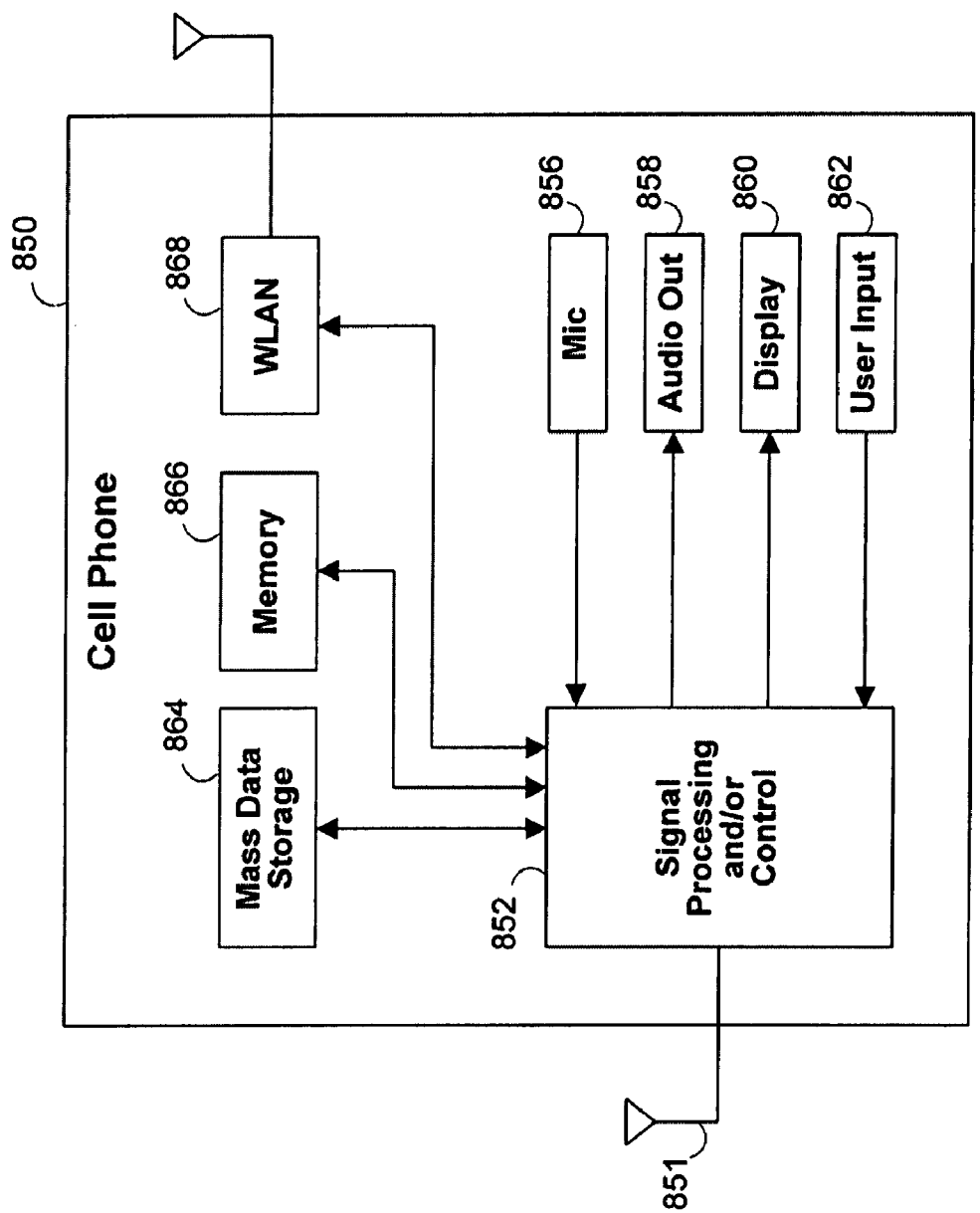
FIG. 8E is a block diagram of an exemplary cell phone that can employ the disclosed technology.

Referring now to FIG. 8E, the present invention can be implemented in a cellular phone 850 that may include a cellular antenna 851. The embodiment of the present invention may implement either or both signal processing and/or control circuits, which are generally identified in FIG. 8E at 852, a WLAN interface 868 and/or mass data storage 864 of the cellular phone 850. In some implementations, the cellular phone 850 includes a microphone 856, an audio output 858 such as a speaker and/or audio output jack, a display 860 and/or a user input device 862 such as a keypad, pointing device, voice actuation and/or other input device. The signal processing and/or control circuits 852 and/or other circuits (not shown) in the cellular phone 850 may process data, perform coding and/or encryption, and/or perform butterfly and FFT stage control, and/or address rotary function, and/or butterfly operations, and/or shuffle registers, and/or perform calculations, format data and/or perform other cellular phone functions.

The cellular phone 850 may communicate with mass data storage 864 that stores data in a nonvolatile manner such as optical and/or magnetic storage devices, for example, hard disk drives HDD and/or DVDs. At least one HDD may have the configuration shown in FIG. 8A and/or at least one DVD may have the configuration shown in FIG. 8B. The HDD may be a mini HDD that includes one or more platters having a diameter that is smaller than approximately 1.8". The cellular phone 850 may be connected to memory 866 such as RAM, ROM, nonvolatile memory such as flash memory and/or other suitable electronic data storage. The cellular phone 850 also may support connections with a WLAN via a WLAN network interface 868. Memory 866 and/or mass data storage 864 may be used to implement either or both data bank 120, and/or twiddle ROM 170, and/or address rotary function 130.

Figure 8F:
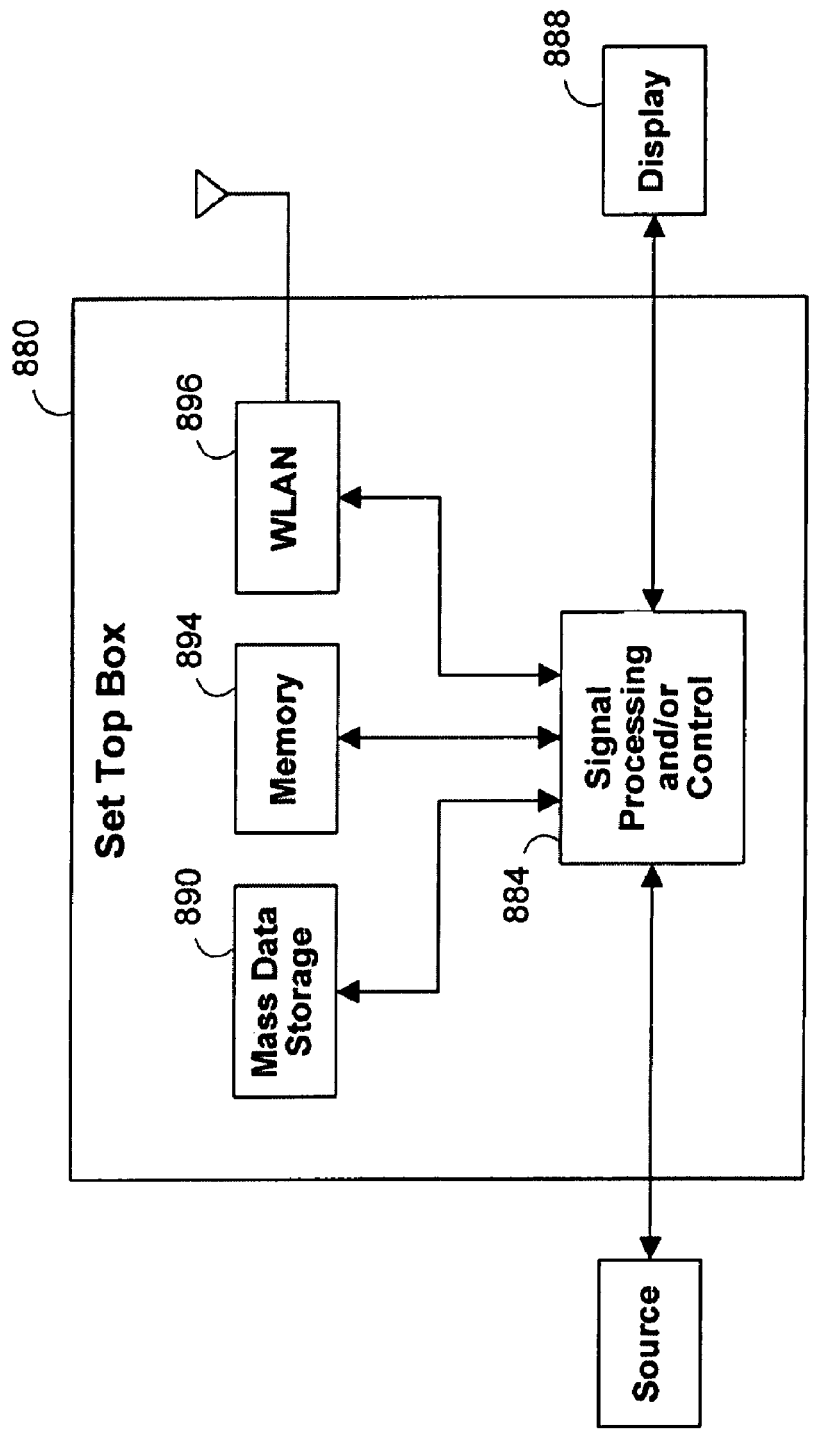
FIG. 8F is a block diagram of an exemplary set top box that can employ the disclosed technology.

Referring now to FIG. 8F, the present invention can be implemented in a set top box 880. The embodiment of the present invention may implement either or both signal processing and/or control circuits, which are generally identified in FIG. 8F at 884, a WLAN interface 896 and/or mass data storage 890 of the set top box 880. The set top box 880 receives signals from a source such as a broadband source and outputs standard and/or high definition audio/video signals suitable for a display 888 such as a television and/or monitor and/or other video and/or audio output devices. The signal processing and/or control circuits 884 and/or other circuits (not shown) of the set top box 880 may process data, perform coding and/or encryption, and/or perform butterfly and FFT stage control, and/or address rotary function, and/or butterfly operations, and/or shuffle registers, and/or perform calculations, format data and/or perform any other set top box function.

The set top box 880 may communicate with mass data storage 890 that stores data in a nonvolatile manner. The mass data storage 890 may include optical and/or magnetic storage devices for example hard disk drives HDD and/or DVDs. At least one HDD may have the configuration shown in FIG. 8A and/or at least one DVD may have the configuration shown in FIG. 8B. The HDD may be a mini HDD that includes one or more platters having a diameter that is smaller than approximately 1.8". The set top box 880 may be connected to memory 894 such as RAM, ROM, nonvolatile memory such as flash memory and/or other suitable electronic data storage. The set top box 880 also may support connections with a WLAN via a WLAN network interface 896. Memory 894 and/or mass data storage 890 may be used to implement either or both data bank 120, and/or twiddle ROM 170, and/or address rotary function 130.

Figure 8G:
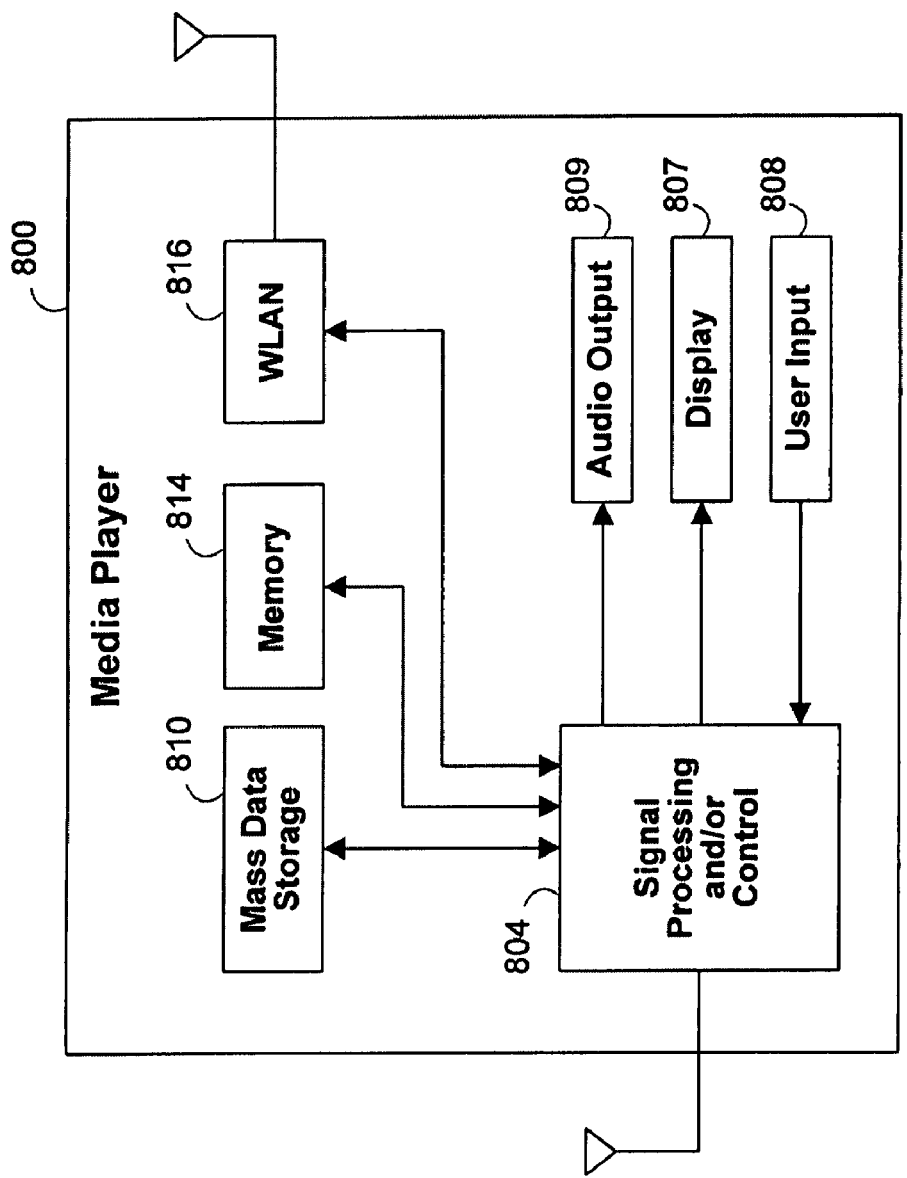
FIG. 8G is a block diagram of an exemplary media player that can employ the disclosed technology.

Referring now to FIG. 8G, the present invention can be implemented in a media player 800. The embodiment of the present invention may implement either or both signal processing and/or control circuits, which are generally identified in FIG. 8G at 804, a WLAN interface 816 and/or mass data storage 810 of the media player 800. In some implementations, the media player 800 includes a display 807 and/or a user input 808 such as a keypad, touchpad and the like. In some implementations, the media player 800 may employ a graphical user interface (GUI) that typically employs menus, drop down menus, icons and/or a point-and-click interface via the display 807 and/or user input 808. The media player 800 further includes an audio output 809 such as a speaker and/or audio output jack. The signal processing and/or control circuits 804 and/or other circuits (not shown) of the media player 800 may process data, perform coding and/or encryption, and/or perform butterfly and FFT stage control, and/or address rotary function, and/or butterfly operations, and/or shuffle registers, and/or perform calculations, format data and/or perform any other media player function.

The media player 800 may communicate with mass data storage 810 that stores data such as compressed audio and/or video content in a nonvolatile manner. In some implementations, the compressed audio files include files that are compliant with MP3 format or other suitable compressed audio and/or video formats. The mass data storage 810 may include optical and/or magnetic storage devices for example hard disk drives HDD and/or DVDs. At least one HDD may have the configuration shown in FIG. 8A and/or at least one DVD may have the configuration shown in FIG. 8B. The HDD may be a mini HDD that includes one or more platters having a diameter that is smaller than approximately 1.8". The media player 800 may be connected to memory 814 such as RAM, ROM, nonvolatile memory such as flash memory and/or other suitable electronic data storage. The media player 800 also may support connections with a WLAN via a WLAN network interface 816. Memory 814 and/or mass data storage 810 may be used to implement either or both data bank 120, and/or twiddle ROM 170, and/or address rotary function 130. Still other implementations in addition to those described above are contemplated.

It should be understood that the foregoing is only illustrative of the principles of the invention, and that the invention can be practiced by other than the described embodiments and aspects of the invention, which are presented for purposes of illustration and not of limitation.

The invention claimed is:

1. A method for performing a Fast Fourier Transform (FFT), the method comprising:
storing to a memory with first and second memory locations a plurality of butterfly data sets in a predetermined order;
performing an FFT butterfly operation on a first of the plurality of butterfly data sets to produce a first result, the first butterfly data set being read from the first memory location;
performing an FFT butterfly operation on a second of the plurality of butterfly data sets to produce a second result, the second butterfly data set being read from the second memory location;
shuffling the first and second results of the FFT butterfly operations to produce first and second shuffled results; and
writing the first and second shuffled results to the first and second memory locations.

2. The method of claim 1 further comprising reading each butterfly data set of the FFT butterfly operation from a single memory location.

3. The method of claim 1, wherein addresses for the first and second memory locations are generated in accordance with an address rotary function.

4. The method of claim 1, wherein the first butterfly data set corresponds to a first FFT butterfly operation of a first FFT stage.

5. The method of claim 4, wherein the shuffling comprises:
identifying a third butterfly data set that corresponds to a first FFT butterfly operation of a second FFT stage; and
analyzing the first and second butterfly data sets to determine which portions of the first and second butterfly data sets correspond to the third butterfly data set.

6. The method of claim 1, wherein the writing further comprises writing a portion of the first result to the second memory location and a portion of the second result to the first memory location.

7. The method of claim 1, wherein the first and second results have a first and a second portion, wherein the shuffling comprises:
combining the first portion of the first result with the second portion of the second result to produce a first shuffled result; and
combining the second portion of the first result with the first portion of the second result to produce a second shuffled result.

8. The method of claim 1 further comprising cascading in series a plurality of FFT butterfly operations performed on the data sets to thereby reduce the complexity of the FFT butterfly operations from a first radix value to a second radix value.

9. The method of claim 8, wherein the number of cascaded operations is substantially equal to three when the first radix value is eight and the second radix value is two.

10. The method of claim 8, wherein the first radix value FFT butterfly operations use a first number of registers and the second radix value FFT butterfly operations use a second number of registers less than the first number of registers.

11. The method of claim 1 further comprising delaying at least the first result of the FFT butterfly operation by a first amount.

12. The method of claim 11, wherein the first amount is substantially equal to the number of cycles in the FFT butterfly operation.

13. The method of claim 1, wherein each butterfly data set comprises a high order and a low order data point, wherein the first and second results of the FFT butterfly operations comprise high order and low order results corresponding to the high and low order data points, wherein the shuffling comprises:
combining the high order result of the first result with the high order result of the second result; and
combining the low order result of the first result with the low order result of the second result.

14. An apparatus for performing a Fast Fourier Transform (FFT), the apparatus comprising:
means for storing to a memory means with first and second memory locations means a plurality of butterfly data sets in a predetermined order;
means for performing an FFT butterfly operation on a first of the plurality of butterfly data sets to produce a first result, the first butterfly data set being read from the first memory location means;
means for performing an FFT butterfly operation on a second of the plurality of butterfly data sets to produce a second result, the second butterfly data set being read from the second memory location means;

means for shuffling the first and second results of the FFT butterfly operations to produce first and second shuffled results; and means for writing the first and second shuffled results to the first and second memory locations means.

15. The apparatus of claim 14 further comprising means for reading each butterfly data set of the FFT butterfly operation from a single memory location means.

16. The apparatus of claim 14, wherein addresses for the first and second memory locations means are generated in accordance with an address rotary means.

17. The method of claim 14, wherein the first butterfly data set corresponds to a first FFT butterfly operation of a first FFT stage.

18. The apparatus of claim 17, wherein the means for shuffling comprises:
means for identifying a third butterfly data set that corresponds to a first FFT butterfly operation of a second FFT stage; and
means for analyzing the first and second butterfly data sets to determine which portions of the first and second butterfly data sets correspond to the third butterfly data set.

19. The apparatus of claim 14, wherein the means for writing further comprises means for writing a portion of the first result to the second memory location means and a portion of the second result to the first memory location means.

20. The apparatus of claim 14, wherein the first and second results have a first and a second portion, wherein the means for shuffling comprises:
means for combining the first portion of the first result with the second portion of the second result to produce a first shuffled result; and
means for combining the second portion of the first result with the first portion of the second result to produce a second shuffled result.

21. The apparatus of claim 14 further comprising means for cascading in series a plurality of FFT butterfly operations performed on the data sets to thereby reduce the complexity of the FFT butterfly operations from a first radix value to a second radix value.

22. The apparatus of claim 21, wherein the number of cascaded operations is substantially equal to three when the first radix value is eight and the second radix value is two.

23. The apparatus of claim 21, wherein the first radix value FFT butterfly operations use a first number of registers means and the second radix value FFT butterfly operations use a second number of registers means less than the first number of registers means.

24. The apparatus of claim 14 further comprising means for delaying at least the first result of the FFT butterfly operation by a first amount.

25. The apparatus of claim 24 wherein the first amount is substantially equal to the number of cycles in the FFT butterfly operation.

26. The apparatus of claim 14, wherein each butterfly data set comprises a high order and a low order data point, wherein the first and second results of the FFT butterfly operations comprise high order and low order results corresponding to the high and low order data points, wherein the means for shuffling comprises:
means for combining the high order result of the first result with the high order result of the second result; and
means for combining the low order result of the first result with the low order result of the second result.

27. A system for performing a Fast Fourier Transform (FFT), the system comprising:
a memory comprising first and second memory locations for storing a plurality of butterfly data sets in a predetermined order;
an FFT butterfly operations unit operating on a first of the plurality of butterfly data sets to produce a first result, the first butterfly data set being read from the first memory location;
an FFT butterfly operations unit operating on a second of the plurality of butterfly data sets to produce a second result, the second butterfly data set being read from the second memory location;
at least one shuffle register configured to shuffle the first and second results of the respective FFT butterfly operations unit to produce first and second shuffled results; and
control circuitry configured to write the first and second shuffled results to the first and second memory locations.

28. The system of claim 27, wherein each butterfly data set of the FFT butterfly operation is read from a single memory location of the memory.

29. The system of claim 27, wherein addresses of first and second memory locations are generated in accordance with an address rotary function.

30. The system of claim 27, wherein the first butterfly data set corresponds to a first FFT butterfly operation of a first FFT stage.

31. The system of claim 30 wherein the control circuitry is further configured to:
determine a third butterfly data set that corresponds to a first FFT butterfly operation of a second FFT stage; and
analyze the first and second butterfly data sets to determine which portions of the first and second butterfly data sets correspond to the third butterfly data set.

32. The system of claim 27, wherein the control circuitry is further configured to write a portion of the first result to the second memory location and a portion of the second result to the first memory location.

33. The system of claim 27, wherein the first and second results have a first and a second portion, wherein the shuffle registers are configured to:
combine the first portion of the first result with the second portion of the second result to produce a first shuffled result; and
combine the second portion of the first result with the first portion of the second result to produce a second shuffled result.

34. The system of claim 27, wherein the control circuitry is further configured to cascade in series a plurality of FFT butterfly operations performed on the data sets to thereby reduce the complexity of the FFT butterfly operations from a first radix value to a second radix value.

35. The system of claim 34, wherein the number of cascaded operations is substantially equal to three when the first radix value is eight and the second radix value is two.

36. The system of claim 27, wherein the at least one shuffle register is further configured to delay at least the first result of the FFT butterfly operation by a first amount.

37. The system of claim 36, wherein the first amount is substantially equal to the number of cycles in the FFT butterfly operation.

38. The system of claim 27, wherein each butterfly data set comprises a high order and a low order data point, wherein the first and second results of the FFT butterfly operations comprise high order and low order results corresponding to the high and low order data points, wherein the shuffle registers are configured to:
combine the high order result of the first result with the high order result of the second result; and
combine the low order result of the first result with the low order result of the second result.

* * * * *